(12) United States Patent
Thom et al.

(10) Patent No.: US 8,607,065 B2
(45) Date of Patent: Dec. 10, 2013

(54) TRUSTED AND CONFIDENTIAL REMOTE TPM INITIALIZATION

(75) Inventors: Stefan Thom, Snohomish, WA (US); Kevin M. Litwack, Seattle, WA (US); Shon Eizenhoefer, Bothell, WA (US); Erik L. Holt, Redmond, WA (US); Yash Gandhi, Maharashtra (IN)

(73) Assignee: Microsoft Corporation, Redmond, WA (US)

( * ) Notice: Subject to any disclaimer, the term of this patent is extended or adjusted under 35 U.S.C. 154(b) by 1300 days.

(21) Appl. No.: 12/249,042

(22) Filed: Oct. 10, 2008

(65) Prior Publication Data

US 2010/0095120 A1 Apr. 15, 2010

(51) Int. Cl.
*G06F 11/30* (2006.01)
*G06F 7/04* (2006.01)
*H04L 9/32* (2006.01)

(52) U.S. Cl.
USPC ........... 713/187; 713/170; 713/189; 713/193; 726/33

(58) Field of Classification Search
USPC ................. 713/170, 187, 189, 193
See application file for complete search history.

(56) References Cited

U.S. PATENT DOCUMENTS

| | | | |
|---|---|---|---|
| 7,299,354 B2 | 11/2007 | Khanna et al. | |
| 7,484,099 B2 * | 1/2009 | Bade et al. | 713/176 |
| 7,640,593 B2 * | 12/2009 | Tarkkala | 726/26 |
| 7,900,058 B2 * | 3/2011 | Mabayoje et al. | 713/189 |
| 8,312,271 B2 * | 11/2012 | Bangerter et al. | 713/168 |
| 2005/0144440 A1 | 6/2005 | Catherman et al. | |
| 2005/0163317 A1 | 7/2005 | Angelo et al. | |
| 2006/0095505 A1 | 5/2006 | Zimmer et al. | |
| 2006/0184785 A1 | 8/2006 | Challener et al. | |
| 2006/0242428 A1 * | 10/2006 | Tarkkala | 713/189 |
| 2007/0226496 A1 | 9/2007 | Maletsky et al. | |
| 2008/0060068 A1 | 3/2008 | Mabayoje et al. | |
| 2008/0184028 A1 * | 7/2008 | Anson et al. | 713/156 |
| 2009/0276620 A1 * | 11/2009 | McCarron et al. | 713/155 |

OTHER PUBLICATIONS

Ulrich Kühn, Klaus Kursawe, Stefan Lucks, Ahmad-Reza Sadeghi and Christian Stüble, "Secure Data Management in Trusted Computing"; Cryptographic Hardware and Embedded Systems—CHES 2005 Lecture Notes in Computer Science, 2005, vol. 3659/2005 [retrieved from SpringerLink database on Nov. 20, 2011].*

David Safford , Jeff Kravitz, Leendert van Doorn, "Take control of TCPA" Linux Journal archive vol. 2003 Issue 112, Aug. 2003 [retrived on Nov. 20, 2011 from ACM database].*

M. Strasser,Asoftware-basedTPM emulator for Linux Semesterarbeit, ETH Zurich, 2004 [retriieved from Internet "http://tpm-emulator.berlios.de/," on Dec. 10, 2012].*

Search Report for Application No. PCT/US2009/059846, mailed Apr. 28, 2010.

Schmidt, "On the deployment of Mobile Trusted Modules", In: IEEE Wireless Communications and Networking Conference, Mar. 31, 2007.

Kuhn, "Secure Data Management in Trusted Computing", In: Cryptographic Hardware and Embedded Systems, Aug. 29, 2005.

(Continued)

*Primary Examiner* — Saleh Najjar
*Assistant Examiner* — Oleg Korsak
(74) *Attorney, Agent, or Firm* — L. Alan Collins; Collins & Collins Intellectual, LLC

(57) ABSTRACT

Techniques are provided to allow remote initialization of a Trusted Platform Module. The results may be trusted and confidential even if the target device has malicious operating system or other software running.

20 Claims, 4 Drawing Sheets

(56) References Cited

OTHER PUBLICATIONS

Congdon, "Implementing IEEE 802.1AR Secure Device Identity with the Trusted Computing Group's TPM", University of California, Davis, ECS 235A paper. Fall 2007.

"Windows Trusted Platform Module Management Step-by-Step Guide", Retrieved at <<http://technet2.microsoft.com/WindowsVista/en/library/29201194-5e2b-46d0-9c77-d17c25c56af31033.mspx?mfr=true>>, Apr. 22, 2008, pp. 8.

Sandra Rouane, "Initializing a TPM for First Use", Retrieved at <<http://e-articles.info/e/a/title/Managing-the-TPM-in-Windows-Vista/s>>, Mar. 24, 2007, pp. 3.

"HP ProtectTools Client Security Solutions Manageability for Customers with Limited IT Resources", Retrieved at <<http://h20331.www2.hp.com/Hpsub/downloads/4AA1-8478ENW__Sec__and__Man__wp.pdf>>, pp. 1-14.

Durfee, et al., "Posture-Based Data Protection", Retrieved at <<http://www2.parc.com/csl/members/gdurfee/pbdp.pdf>>, pp. 20.

"CCMV20—OV Client Configuration Mgr 2.0", Retrieved at <<http://www.hp.com/softwarereleases/releases-media2/OV__monthly/11__06__Eng.pdf>>, pp. 4.

CN Notice on the First Office Action for Application No. 200980140559.1, Jun. 27, 2013.

* cited by examiner

TRUSTED AND CONFIDENTIAL REMOTE TPM INITIALIZATION

BACKGROUND

Trusted Platform Modules (TPMs) are hardware microcontrollers that store cryptographic keys, passwords, and digital certificates. TPMs also provide capabilities that allow authentication of devices, such as desktop computers, laptops, or cellular telephones. Once initialized, TPMs may be used to generate digital signing and encryption keys, allowing confirmation that messages are from the device that the message claims to be from. TPMs support commands including, for example, Init to initialize a TPM, TakeOwnership to set the owner value, and CreateEndorsementKeyPair to internally generate a key pair.

TPMs are often used in enterprise environments to allow systems to verify the source of information. TPMs must be securely and confidentially initialized before the keys and services provided by the device can be trusted.

SUMMARY

Described herein are, among other things, techniques for securely and confidentially initializing trusted platform modules remotely. For example, if a TPM is not securely and confidentially initialized, a malicious machine or operating system could host a emulated TPM in software and thereby deceive users and applications into thinking they can rely upon real TPM trust properties. A TPM emulated in this way may, for example, allow malicious software to gain access to secret cryptographic key material, or falsely report system configuration.

In one implementation, secure communications may be enabled by using a key provided by a device manufacturer. The secure communications may then allow a system administrator to perform a TakeOwnership operation remotely, rather than executing it locally on each device and risking exposure of sensitive information to the local software.

DESCRIPTION OF THE DRAWINGS

The detailed description provided below in connection with the appended drawings is intended as a description of example implementations and is not intended to represent the only forms in which a trusted and confidential remote initialization of a TPM may be performed. The description sets forth the functions of example implementations and the sequence of steps for constructing and operating the examples. However, the same or equivalent functions and sequences may be accomplished by alternate implementations.

The present description will be better understood from the following detailed description read in light of the accompanying drawings, wherein.

DETAILED DESCRIPTION

Figure 1:
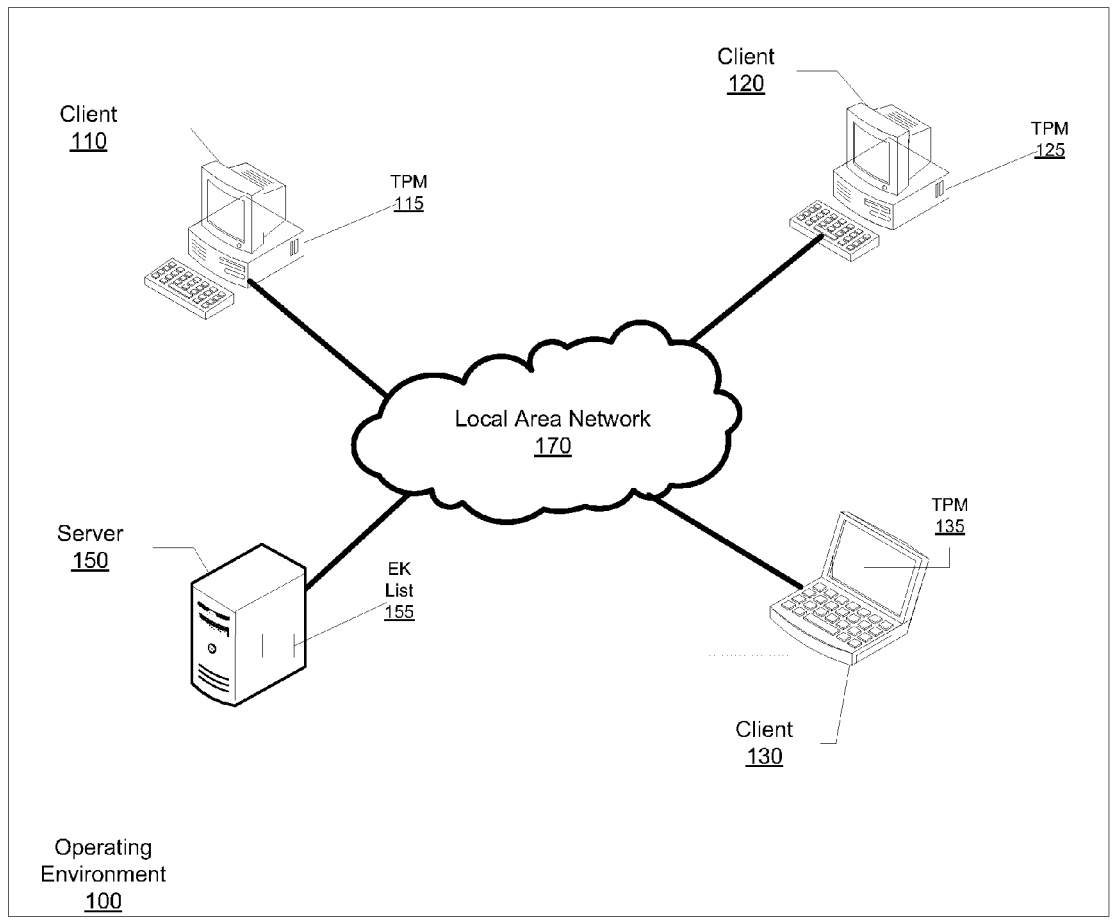
FIG. 1 is an example of an operating environment in which trusted and confidential remote TPM initialization may be implemented.

Described herein are, among other things, examples of various technologies and techniques that allow trusted and confidential remote TPM initialization. Although the examples are described and illustrated herein as being implemented in a personal computer system, the system described is provided as an example and not a limitation. As those skilled in the art will appreciate, the present examples are suitable for application in a variety of different types of systems.

In the figures, like reference numerals are used throughout several drawings to refer to similar components.

FIG. 1 is an example of an operating environment 100 in which trusted and confidential remote TPM initialization may be implemented. Server 150 contains an Endorsement Key list 155 provided by the manufacturers of Clients 110, 120, 130. The EK list 155 allows Server 150 to safely communicate over Local Area network 170 to remotely initialize TPMs 115, 125, 135.

Figure 2:
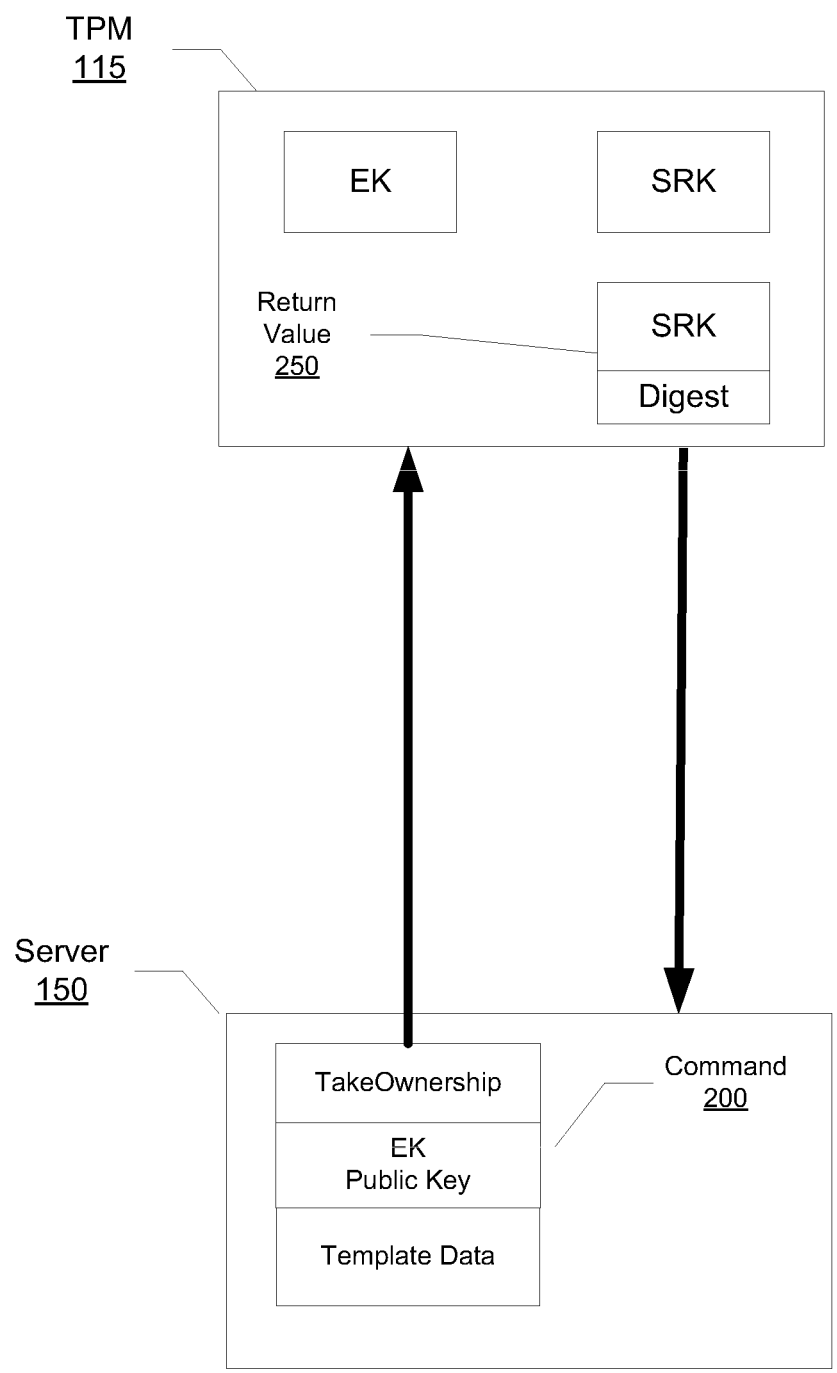
FIG. 2 provides additional detail for parts of FIG. 1, and adds an indication of an example data flow.

Further details may be seen in FIG. 2, which shows an example of data flow between Server 150 and TPM 115. In this example, Server 150 uses a public key for TPM 115's EK to encrypt template data as part of TakeOwnership command 200, and submits it to TPM 115.

While this example uses an Endorsement Key list 155 provided by the manufacturers of Clients 110, 120, 130, in other implementations it could be an individual certificate from a trusted TPM vendor. One skilled in the art will realize that there may be several techniques used to authenticate the TPM.

Figure 3:
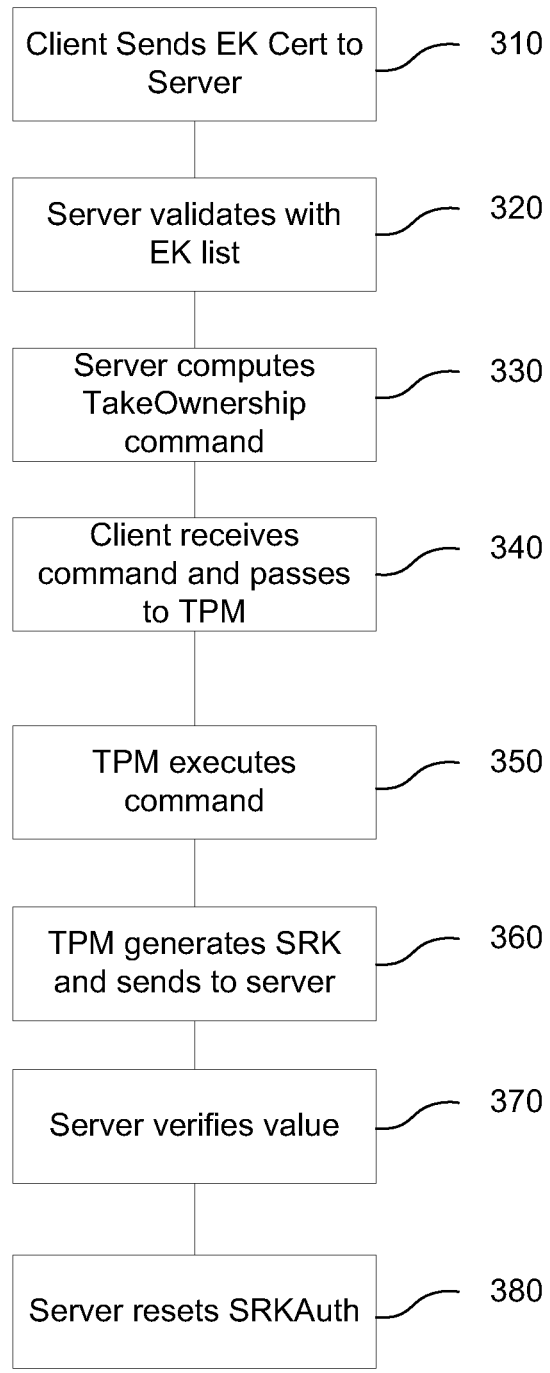
FIG. 3 is a flow chart showing on example of an implementation of trusted and confidential remote TPM initialization.

FIG. 3 is a flow chart providing more detail on one possible implementation of this process. A client initiates the process by sending 310 an EK certificate from a TPM to a server. The server validates 320 the certificate using EK information provided by the client's manufacturer. The server then computes 330 a TakeOwnership command, including server-specified values for OwnerAuth and SRKAuth for the TPM, and encrypts the command with the public key portion of the TPM's EK. The server then sends this encrypted command to the client, which passes it 340 to the TPM. The client software cannot read the data because it is encrypted with a protected TPM key.

The TPM then decrypts the encrypted data using the EK private key, and executes 350 the TakeOwnership command. The TPM then creates a Storage Root Key (SRK), calculates a keyed-Hash Message Authentication Code (HMAC), and sends 360 that data back to the server. Because it is just a digest, the client cannot read it even if the client is malicious. The server can verify the HMAC, since it contains the shared secret of the SRK, and trust that the data is confidential and is from the TPM specified by the EK certificate obtained from the manufacturer by using 370 the EK provided by the manufacturer.

At this point in the process, the client cannot use or create keys on the TPM because the SRK is set to a secret value. To resolve this, the server initiates an encrypted tunnel to the TPM using the SRK public key. The client cannot pretend to be the TPM since it does not have the SRK private key. Once the tunnel is established, the server can generate keys, create identities, and set up the delegation tables. The server may also generate a trusted signing key that can be used for the TPM operation CertifyKey, which will allow the server to confirm that any future key is, in fact, from the TPM.

Once the server has completed the operations desired for initializing the TPM, it will reset 380 SRKAuth back to the well-known value of all zeroes, so that the client can use the TPM to generate and use keys, but preventing the client from performing Owner privileged operations. After the initial configuration is successful, the server may also re-open the encrypted channel and modify the configuration of the TPM at a later time.

Figure 4:
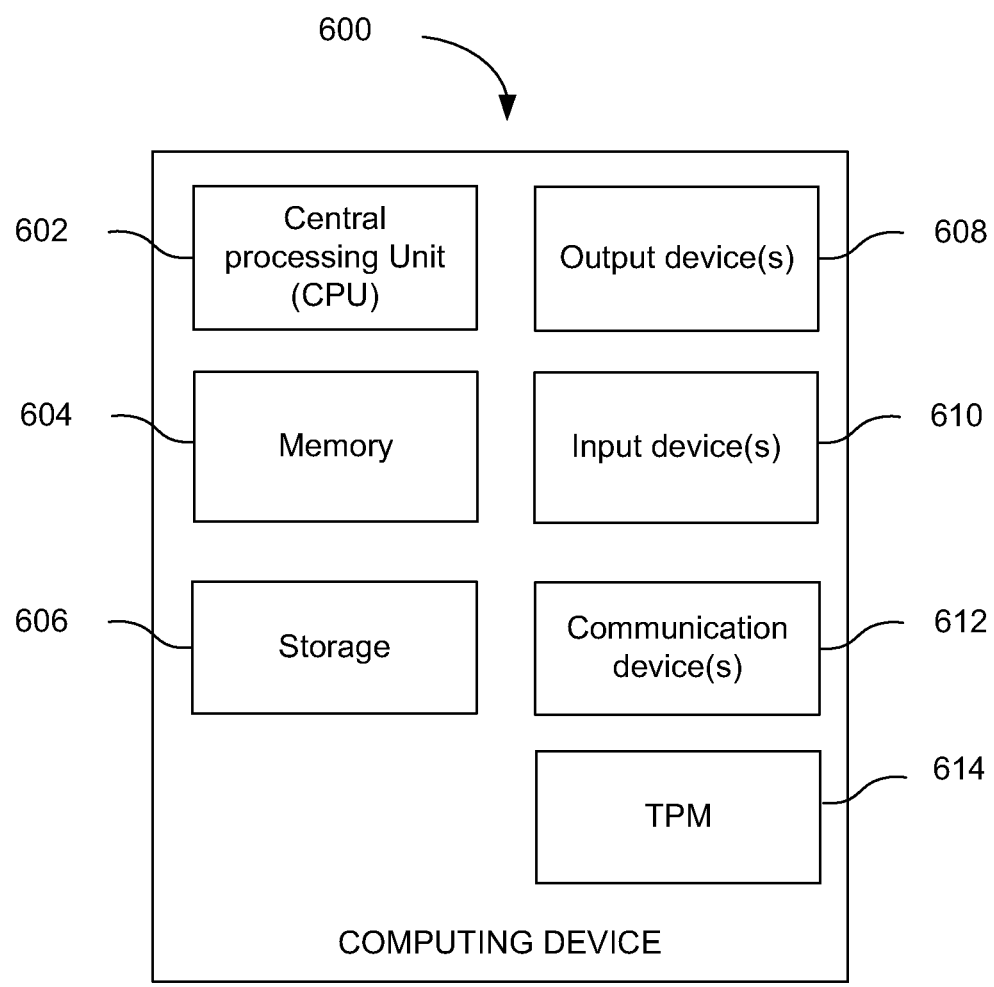
FIG. 4 illustrates a component diagram of a computing device according to one embodiment.

FIG. 4 illustrates a component diagram of a computing device according to one embodiment. The computing device 600 can be utilized to implement one or more computing devices, computer processes, or software modules described herein. In one example, the computing device 600 can be utilized to process calculations, execute instructions, receive and transmit digital signals In another example, the computing device 600 can be utilized to process calculations, execute instructions, receive and transmit digital signals, receive and transmit search queries, and hypertext, compile computer code as required by Server 150 or Clients 110, 120, 130.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604. Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 206. Computer storage media includes volatile and nonvolatile, removable and non-removable media implemented in any method or technology for storage of information such as computer readable instructions, data structures, program modules or other data. Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Computing device 600 may also have a Trusted Platform Module (TPM).

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method performed on a computing device, the method comprising:
    receiving a certificate of an Endorsement Key of a remote Trusted Platform Module, the computing device comprising an endorsement key list and configured for remotely initializing the remote Trusted Platform Module, the remotely initializing based on the computing device communicating securely over a network with the remote Trusted Platform Module, the communicating securely based at least in part on the endorsement key list;
    validating the received certificate;
    computing a TPM_TakeOwnership command;
    encrypting, using a public portion of the Endorsement Key, the computed TPM_TakeOwnership command;
    sending the encrypted TPM_TakeOwnership command to the remote Trusted Platform Module;
    receiving, in response to the sent TPM_TakeOwnership command, a message from the remote Trusted Platform Module; and
    verifying that the received message originated from the remote Trusted Platform Module.

2. The method of claim 1 wherein the received message comprises a hash digest.

3. The method of claim 2 where the hash digest comprises a keyed-Hash Message Authentication Code.

4. The method of claim 2 where the hash digest is calculated from a Storage Root Key.

5. The method in claim 1 further comprising sending a command configured for resetting an authorization value of a storage root key of the Trusted Platform Module to all zeroes.

6. The method of claim 1 wherein the Trusted Platform Module is a part of a laptop computer.

7. The method of claim 1 wherein the Trusted Platform Module is a part of is a cellular telephone.

8. A computing device configured for initializing a remote Trusted Platform Module based on actions comprising:
    receiving a certificate of an Endorsement Key of the remote Trusted Platform Module, the computing device comprising an endorsement key;
    remotely initializing the remote Trusted Platform Module, the remotely initializing based on the computing device communicating securely over a network with the remote Trusted Platform Module, the communicating securely based at least in part on the endorsement key list;
verifying the received certificate;
computing a TPM_TakeOwnership command;
encrypting, using a public portion of the Endorsement Key, the computed TPM_TakeOwnership command;
sending the encrypted TPM_TakeOwnership command to the remote Trusted Platform Module;
receiving, in response to the sent TPM_TakeOwnership command, a hash digest from the remote Trusted Platform Module; and
verifying that the received has digest originated from remote Trusted Platform Module.

9. The computing device of claim 8 where the received message comprises a hash digest.

10. The computing device of claim 8 wherein the Trusted Platform Module is disposed on a laptop computer.

11. The computing device of claim 8 wherein the Trusted Platform Module is disposed on a cellular telephone.

12. At least one computer storage device storing computer-executable instructions that, when executed by a computing device, cause the computing device to perform actions comprising:
receiving a certificate of an Endorsement Key of a remote Trusted Platform Module, the computing device comprising an endorsement key list and configured for remotely initializing the remote Trusted Platform Module, the remotely initializing based on the computing device communicating securely over a network with the remote Trusted Platform Module, the communicating securely based at least in part on the endorsement key list;
validating the received certificate;
computing a TPM_TakeOwnership command;
encrypting, using a public portion of the Endorsement Key, the computed TPM_TakeOwnership command;
sending the encrypted TPM_TakeOwnership command to the remote Trusted Platform Module;
receiving, in response to the sent TPM_TakeOwnership command, a message from the remote Trusted Platform Module; and
verifying that the received message originated from the remote Trusted Platform Module.

13. The at least one computer storage device of claim 12 where the received message comprises a hash digest.

14. The at least one computer storage device of claim 12, the actions further comprising sending a command configured for resetting an authorization value of a storage root key of the Trusted Platform Module to all zeroes.

15. The at least one computer storage device of claim 12 where the Trusted Platform Module is a part of a laptop computer.

16. The at least one computer storage device of claim 12 where the Trusted Platform Module is a part of is a cellular telephone.

17. The at least one computer storage device of claim 13 where the hash digest is calculated from a Storage Root Key.

18. The at least one computer storage device of claim 13 where the hash digest comprises a keyed-Hash Message Authentication Code.

19. The computing device of claim 9 where the hash digest is calculated from a Storage Root Key.

20. The computing device of claim 9 where the hash digest comprises a keyed-Hash Message Authentication Code.

* * * * *